No. 819,535. PATENTED MAY 1, 1906.
E. FROMM & C. S. EDICK.
HAY FORK.
APPLICATION FILED MAY 24, 1905.
2 SHEETS—SHEET 1.
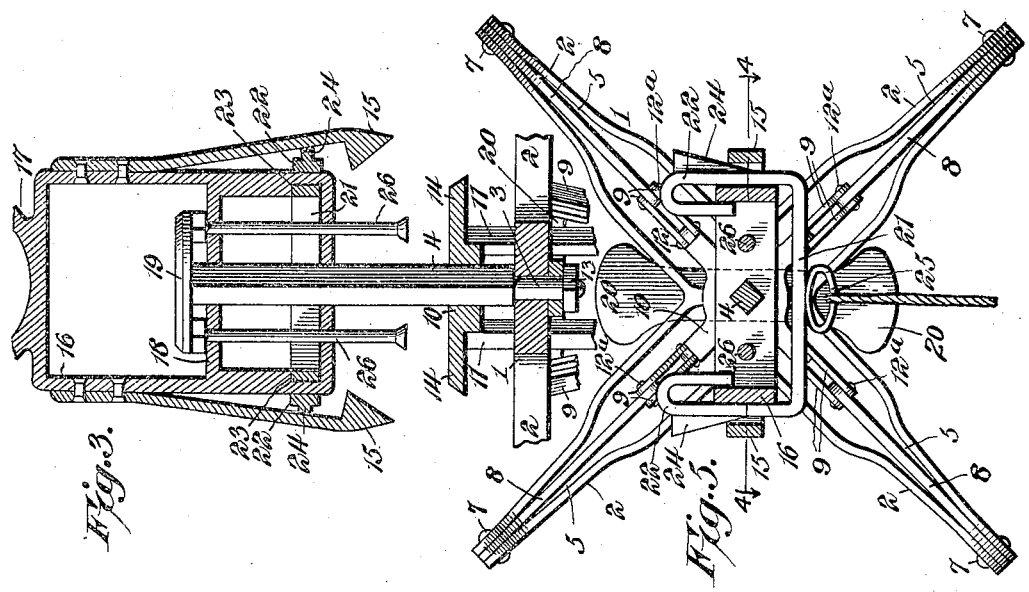
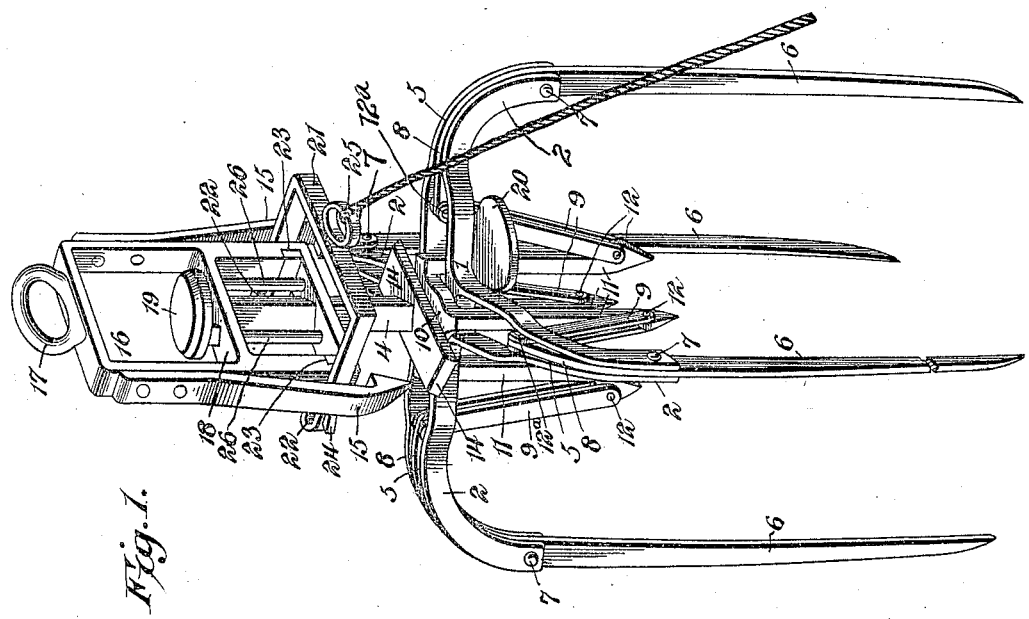
Witnesses
Howard N. Orr.
H. F. Riley
Inventors
E. Fromm and Charles S. Edick,
By C. G. Siggers
Attorney

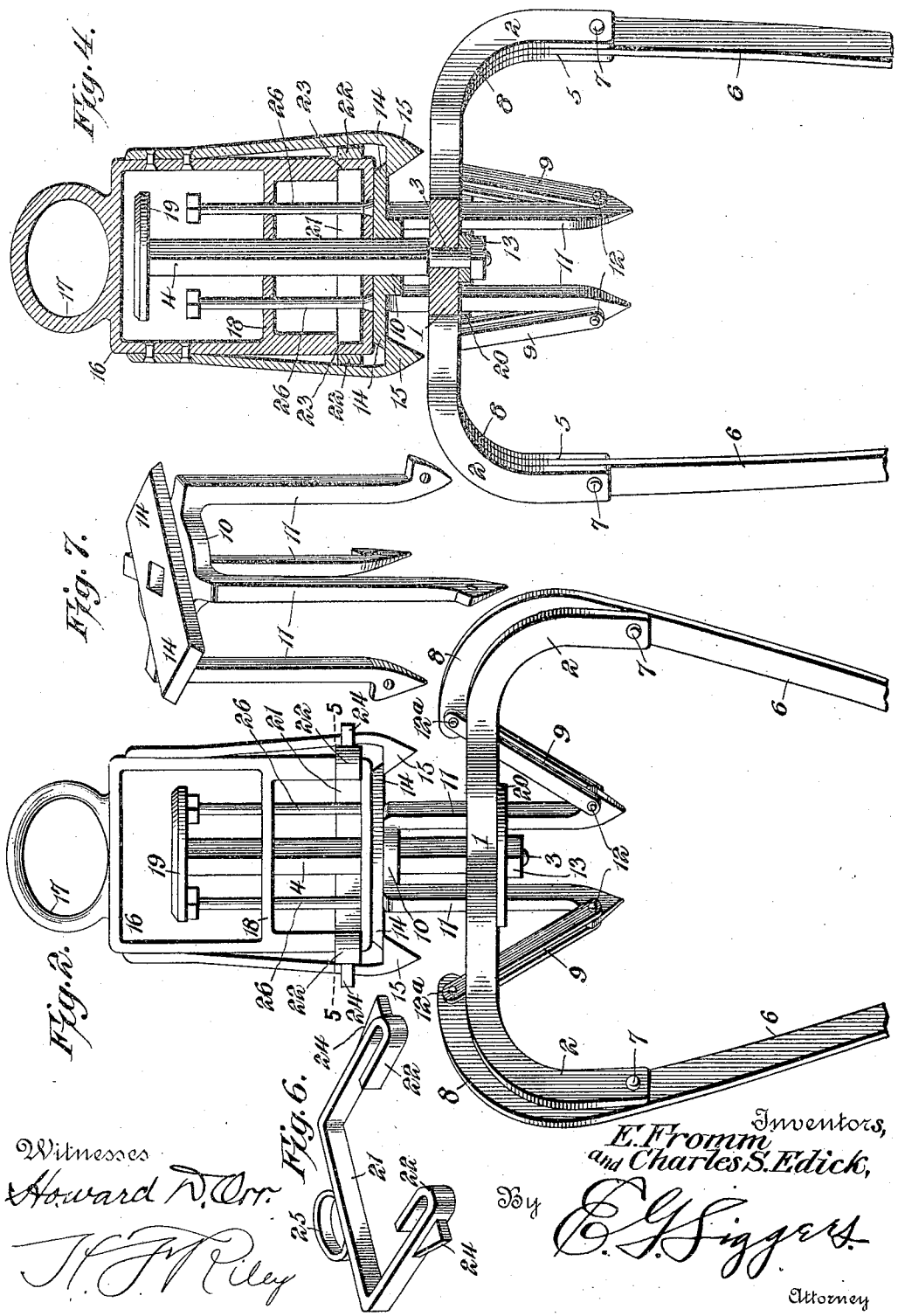

UNITED STATES PATENT OFFICE.

EDWARD FROMM AND CHARLES S. EDICK, OF ELDORA, IOWA.

HAY-FORK.

No. 819,535.  Specification of Letters Patent.  Patented May 1, 1906.

Application filed May 24, 1905. Serial No. 262,103.

*To all whom it may concern:*

Be it known that we, EDWARD FROMM and CHARLES S. EDICK, citizens of the United States, residing at Eldora, in the county of Hardin and State of Iowa, have invented a new and useful Hay-Fork, of which the following is a specification.

The invention relates to improvements in hay-forks.

The object of the present invention is to improve the construction of hay-forks and to provide a simple and comparatively inexpensive one of great strength and durability designed for handling straw, corn-fodder, and similar material in addition to hay and capable of firmly binding a load of such material from the top to the bottom and of thereby preventing fine hay and the like from escaping from the fork.

A further object of the invention is to provide a hay-fork of this character which will be maintained in engagement with a load by the weight of the same and which when tripped will be operated by the weight of the load to effect a discharge of the same.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a hay-fork constructed in accordance with this invention, the parts being in position for discharging a load. Fig. 2 is a side elevation of the same, the tines being closed for engaging a load. Fig. 3 is a vertical sectional view, the parts being in the position shown in Fig. 1. Fig. 4 is a sectional view on the line 4 4 of Fig. 5, the tines being open and the slidable tine-controlling member being locked to the hanger. Fig. 5 is a horizontal sectional view on the line 5 5 of Fig. 2. Fig. 6 is a detail perspective view of the slidable tripping device. Fig. 7 is a detail perspective view of the slidable tine-controlling member.

Like numerals of reference designate corresponding parts in all the figures of the drawings.

1 designates the fork-head, consisting of a metallic spider provided with radially-arranged arms 2, extending from and formed integral with a central portion which is provided with an opening for the reception of the lower end 3 of a vertical bar 4. The arms of the fork-head, which are substantially L-shaped, consist of horizontal and substantially vertical portions curved at their contiguous ends, as shown. The arms are composed of two sides or members spaced apart to provide slots or openings 5 for the reception of tines 6, which are secured between their ends to the lower terminals of the depending vertical portions of the arms 2 by means of pivots 7. The tines 6, which have their lower portions tapered or pointed to enable them to be readily introduced into the material, are adapted to swing inwardly and outwardly to grip and bind a load of hay or other material and to release the same, and their upper arms 8 are substantially L-shaped, being curved to conform to the configuration of the arms of the fork-head.

The inwardly-extending upper portions of the tines 6 are connected by links 9 with a slidable tine-controlling member 10, which consists of a central body portion provided with depending arms 11, extending through the slots or openings between the sides of the arms 2 and connected by pivots 12 to the links 9. The upper ends of the tines terminate short of the depending arms of the slidable tine-controlling member, and the links 9, which are arranged in pairs and which are disposed at an inclination, are connected at their upper ends by pivots 12$^a$ to the upper end of the tines, and they extend downwardly and inwardly to the lower ends of the arms 11. The lower ends of the arms 11 are enlarged to provide projecting ears for the reception of the lower pivots 12 of the links.

The slidable tine-controlling member is provided with a central rectangular opening to receive the bar 4, which is square and which forms a guide for the tine-controlling member. The link connection between the upper ends of the pivoted tines and the lower ends of the arms of the slidable tine-controlling member enable the tines to be moved freely in the operation of the device hereinafter explained. The lower end 3 of the guide is reduced to form a shoulder, and the reduced end extends through a central opening of the fork-head 1 and is threaded to receive a nut 13, which engages the bottom of the fork-head. The fork-head is firmly clamped between the nut 13 and the shoulder formed by reducing the lower end of the guide-bar 4. The tine-controlling member 10 slides on the guide when the tines open and close, and its central body portion is arranged adjacent to the fork-head when the tines are open, as clearly illustrated in Figs. 1 and 4 of the drawings.

The slidable member 10 is also provided with projecting lugs or flanges 14, beveled at their ends and adapted to be engaged by a pair of oppositely-disposed resilient catches 15, which are carried by a hanger or frame 16 and which are adapted to lock the slidable member to the said hanger or frame, whereby when the parts are in the position illustrated in Fig. 2 of the drawings and the tines are in engagement with the load the strain incident to the weight of the load will operate to maintain the tines firmly in engagement with the load. By disengaging the catches from the slidable member when the parts are in the position illustrated in Fig. 2 the said slidable member will be free to move toward the fork-head, and the weight of the load will operate to open the tines and effect a discharge of the contents thereof.

The frame or hanger is substantially oblong, being composed of vertical sides and horizontal ends, and it is provided at its top with a ring 17, adapted to form a grip and designed also for enabling a hoisting-rope or the like to be readily attached to the hay-fork. The hanger or frame 16 is also provided with a cross-piece 18, having an opening to receive the guide 4, which also passes through an opening in the lower end of the frame or hanger. The upper end of the guide is provided with a projecting flange or head 19 for limiting the movement of the frame or hanger and for preventing the fork-head from becoming disconnected from the same.

The catches 15 are arranged substantially in a vertical position and are provided with resilient shanks, which are riveted or otherwise secured to the exterior of the sides of the frame or hanger, near the top thereof, and the catches are provided at the lower ends of the shanks with beveled heads for engaging the lugs or flanges 14 of the slidable member 10. The head of the fork is provided with opposite integral projecting foot-pieces 20, arranged horizontally and adapted to be readily engaged by the foot of the operator both for introducing the tines into the hay and for separating the slidable member from the fork-head to cause the tines to compress and embrace the load. The strain on the hay-fork will maintain the tines in engagement with the load. The projecting foot-pieces 20 may, however, be omitted, as the tines move freely on their pivots 7 in opening and closing, owing to the particular arrangement of the link connections between them and the slidable tine-controlling member.

When it is desired to discharge the load from the hay-fork, the catches are disengaged from the slidable member by a slidable tripping device 21, which is substantially U-shaped and which is composed of parallel sides slidably connected with the sides of the frame or hanger and interposed between the same and the lower portions of the catches. The sides of the slidable tripping device are provided with loops 22, formed by bending the same inwardly on themselves, as clearly illustrated in Fig. 5 of the drawings, and receiving the sides of the frame or hanger, which are provided at their inner faces with grooves 23, forming ways or guides for the tripping device. The sides of the tripping device are provided at their outer faces with tapering or wedge-shaped enlargements or portions 24, which when the tripping device is drawn outward are carried into engagement with the resilient catches, and the latter are thereby forced outwardly and disengaged from the projecting lugs or flanges of the slidable member 10. The sides of the slidable tripping device are connected by a cross-piece which is provided with an eye or ring 25, adapted to receive a tripping-cord, so that the operator can by pulling on the cord discharge the load at any point. After the hay-fork has been tripped the tripping device is moved inwardly and the catches of the frame or hanger are reëngaged with the slidable member 10.

In order to insure a positive operation of the hay-fork, the frame or hanger is provided with a pair of vertically-reciprocatable rods or bolts 26, located opposite the sides of the guide and piercing the cross-bar 18 at the lower end of the frame or hanger. The cross-bar 18 and the lower end of the frame or hanger are provided with alined openings for guiding the rods or bolts 26, which are provided at their lower ends with heads and at their upper ends with nuts; but any other suitable means may be employed for retaining the rods or bolts in the guide-openings of the frame or hanger. When the parts of the hay-fork are in the position illustrated in Fig. 2, the reciprocatable rods extend from the tine-controlling member to the projecting flange or head 19 of the guide-bar 4, whereby when the catches are thrown out of engagement with the tine-controlling member the weight of the load will be thrown upon the reciprocatable rods or bolts 26, which will transmit the pressure to the tine-controlling member and cause the tines to open for discharging their contents. By throwing the weight of the load upon the rods or bars 26 the tine-controlling member is subjected to a blow and to a downward pressure equal to the weight of the load, and a positive operation of the hay-fork is insured.

Having thus fully described our invention, what we claim as new, and desire to secure by Letters Patent, is—

1. A fork of the class described, comprising a head, tines pivotally connected with the head, a member also connected with the tines and movable independently of the head, and a hanger connected with and having a limited movement independent of the head and provided with means for detachably engaging the said member.

2. A fork of the class described, comprising a head, tines pivotally connected with the head, a member also connected with the tines and movable independently of the head, a hanger connected with and having a limited movement independent of the head and provided with means for detachably engaging the said member, and a tripping device for disconnecting the said member from the hanger.

3. A fork of the class described, comprising a head, tines pivotally connected with the head, a member connected with the tines and movable independently of the head to permit the tines to open and close, a hanger, and a catch for detachably connecting the hanger with the member, said catch being carried by one of the parts.

4. A fork of the class described, comprising a head, tines pivotally connected with the head, a member connected with the tines and movable independently of the head to permit the tines to open and close, a hanger, a catch for detachably connecting the hanger with the member, said catch being carried by one of the parts, and a tripping device for throwing the catch out of engagement to release the said member.

5. A fork of the class described, comprising a head, tines pivotally connected therewith, a member connected with the tines and movable independently of the head to permit the tines to open and close, a hanger provided with a catch arranged to engage the said member, and a tripping device for throwing the catch out of engagement with the member.

6. A fork of the class described, comprising a head, tines pivotally connected therewith, a member connected with the tines and movable independently of the head to permit the tines to open and close, a hanger provided with a catch arranged to engage the said member, and a slidable tripping device having a tapered or wedge-shaped portion arranged to throw the catch out of engagement with the said member.

7. A fork of the class described, comprising a head having a guide, tines pivotally connected with the head, a member slidable on the guide and connected with the tines, a hanger movable on the guide, and means for detachably connecting the member with the hanger.

8. A fork of the class described, comprising a head having a guide, tines pivotally connected with the head, a member slidable on the guide and connected with the tines, a hanger movable on the guide, a catch for detachably connecting the member with the hanger, and means for releasing the said member.

9. A fork of the class described, comprising a head, tines pivotally connected with the head, a guide extending from the head, a member slidable on the guide and connected with the tines, a hanger also slidable on the guide and provided with a catch arranged to engage the said member, and a movable tripping device mounted on the hanger for throwing the catch out of engagement with the said member.

10. A fork of the class described, comprising a head, tines pivotally connected with the head, a bar extending from the head and forming a guide, a slidable member mounted on the bar and connected with the tines, and a hanger having a limited movement on the bar and provided with means for detachably connecting it with the said member.

11. A fork of the class described, comprising a head, tines pivotally connected with the head, a bar extending from the head, a slidable member mounted on the bar and slidably and pivotally connected with the tines, and a hanger slidable on the bar and provided with means for detachably connecting it with the said member.

12. A fork of the class described, comprising a head, tines pivotally connected to the head, a tine-controlling member capable of movement independently of the head, links connecting the tine-controlling member with the said tines, a hanger having a limited movement independently of the head, and means for detachably connecting the hanger with the movable member.

13. A fork of the class described, comprising a head having arms, tines pivotally connected between their ends to the arms, a slidable member, links connecting the slidable member with the tines, and a hanger movable independently of the head and provided with means for detachably engaging the slidable member.

14. A fork of the class described, comprising a head having arms and provided with a guide, tines pivotally connected with the arms, a slidable member mounted on the guide and provided with depending arms, links connecting the latter with the tines, and a hanger movably mounted on the guide and provided with means for detachably engaging the slidable member.

15. A fork of the class described, comprising a head having arms composed of two sides or portions spaced apart to provide openings, tines pivoted between their ends in the openings of the arms, a guide extending upward from the head, a slidable member mounted on the guide and having depending arms extending through the said openings, inclined links extending from the arms of the slidable member to the tines, and a hanger slidable on the guide and provided with means for detachably engaging the slidable member.

16. A fork of the class described, comprising a head, tines pivotally connected with the head, a bar extending from the head and forming a guide, a slidable member mounted on the bar and connected with the tines, a frame or hanger slidable on the bar, catches located at opposite sides of the frame or hanger and arranged to engage the said member, and a tripping device slidable on the frame or hanger and provided with means for throwing the catches out of engagement with the said members.

17. A fork of the class described, comprising a head, tines pivoted to the head, a bar extending from the head and forming a guide, a member slidable on the bar and connected with the tines, a frame or hanger also slidable on the bar and having opposite sides provided with guides and spaced from the bar, catches mounted on the sides of the frame or hanger and arranged to engage the said member, and a tripping device composed of sides having loops to embrace the sides of the frame or hanger and arranged in the guides thereof and provided with means for throwing the catches out of engagement with the said member.

18. A fork of the class described, comprising a head having arms and provided between the same with a projecting foot-piece, tines pivotally connected with the arms of the head, a guide extending from the head, a member slidable on the guide and connected with the tines, a hanger, and means for detachably connecting the hanger with the said member.

19. A fork of the class described, comprising a head, tines pivotally connected with the head, a guide extending from the head, a slidable member mounted on the guide and connected with the tines and having projecting lugs or flanges, and a hanger slidable on the guide and provided with catches arranged to engage the lugs or flanges.

20. A fork of the class described, comprising a head, tines pivotally connected with the head, a member also connected with the tines and movable independently of the head, means for locking and tripping the tines, and means for subjecting the said member to the weight of the load when the tines are tripped.

21. A fork of the class described, comprising a head, tines pivotally connected with the head, a member also connected with the tines and movable independently of the head, a hanger connected with and having a limited movement independently of the head, and provided with means for detachably engaging the said member, a tripping device for disconnecting the said member from the hanger, and means mounted on the hanger for subjecting the said member to the weight of the load when the tripping device is operated.

22. A fork of the class described, comprising a head, tines pivotally connected with the head, a member also connected with the tines and movable independently of the head, a hanger connected with and having a limited movement independently of the head and provided with means for detachably engaging the said member, a tripping device for disconnecting the said member from the hanger, and a reciprocatable device mounted on the hanger and arranged to engage the said member when the tripping device is operated, whereby the said member will be subjected to the weight of the load.

23. A fork of the class described, comprising a head having a guide, tines pivotally connected with the head, a member slidable on the guide and connected with the tines, a hanger movable on the guide, means for detachably connecting the member with the hanger, and a reciprocatable device interposed between the guide and the member, whereby the latter will be subjected to the weight of the load when the fork is tripped.

24. A hay-fork of the class described, comprising a head, tines pivotally connected with the head, a guide extending from the head and having a projecting portion, a member slidable on the guide and connected with the tines, a hanger, rods slidable on the hanger and interposed between the projecting portion of the guide and the said member, and means for detachably connecting the hanger with the said member.

25. A hay-fork of the class described, comprising a head, tines pivoted to the head, a guide-bar extending from the head and provided with a projecting portion, a member slidable on the bar and connected with the tines, a frame or hanger also slidable on the bar, catches mounted on the sides of the frame or hanger and arranged to engage the said member, slidable rods mounted on the frame or hanger at opposite sides of the guide-bar and arranged to be engaged by the projecting portion thereof and adapted to engage the said member, and a tripping device for throwing the catches out of engagement with the member.

In testimony that we claim the foregoing as our own we have hereto affixed our signatures in the presence of two witnesses.

EDWARD FROMM.
CHARLES S. EDICK.

Witnesses:
NEWELL F. GOLLY,
CHARLES A. ROYERS.